United States Patent [19]

Flippo, Jr.

[11] Patent Number: 4,770,028
[45] Date of Patent: Sep. 13, 1988

[54] HYDROCARBON TANK LEAK DETECTION SYSTEM

[76] Inventor: W. J. B. Flippo, Jr., 2340 Marifold, Fort Worth, Tex. 76111

[21] Appl. No.: 99,162

[22] Filed: Sep. 21, 1987

[51] Int. Cl.$^4$ .............................................. G01M 3/20
[52] U.S. Cl. ...................................... 73/40.7; 73/49.2; 436/3
[58] Field of Search .................... 73/40.7, 40, 49.2; 436/3

[56] References Cited

U.S. PATENT DOCUMENTS

| 4,189,938 | 2/1980 | Heim | 73/40.7 |
| 4,537,328 | 8/1985 | Keesee et al. | 220/445 |
| 4,561,292 | 12/1985 | Pugnale et al. | 73/49.2 |
| 4,568,925 | 2/1986 | Butts | 73/49.2 X |
| 4,644,354 | 2/1987 | Kidd | 73/49.2 X |
| 4,682,156 | 7/1987 | Wainwright | 73/40 X |

FOREIGN PATENT DOCUMENTS

| 1804441 | 5/1970 | Fed. Rep. of Germany | 73/40.7 |
| 1650053 | 11/1970 | Fed. Rep. of Germany | 73/40.7 |
| 52-18391 | 2/1977 | Japan | 73/40.7 |

Primary Examiner—Stewart J. Levy
Assistant Examiner—Joseph W. Roskos
Attorney, Agent, or Firm—James E. Bradley

[57] ABSTRACT

A leak detection system for detecting leaks of a hydrocarbon from an underground tank uses a dye that is soluble in hydrocarbon, but not in water. At least one riser pipe extends from a point adjacent the bottom of the tank to the surface. The lower end of the riser pipe is perforated. A permeable container containing a quantity of the dye is placed in the bottom of the pipe. A line extends from the container to the top of the pipe for enabling an inspector to periodically pull the container to the surface to determine if the color of the container has changed, indicating leakage of hydrocarbon liquid.

9 Claims, 1 Drawing Sheet

U.S. Patent  Sep. 13, 1988  4,770,028
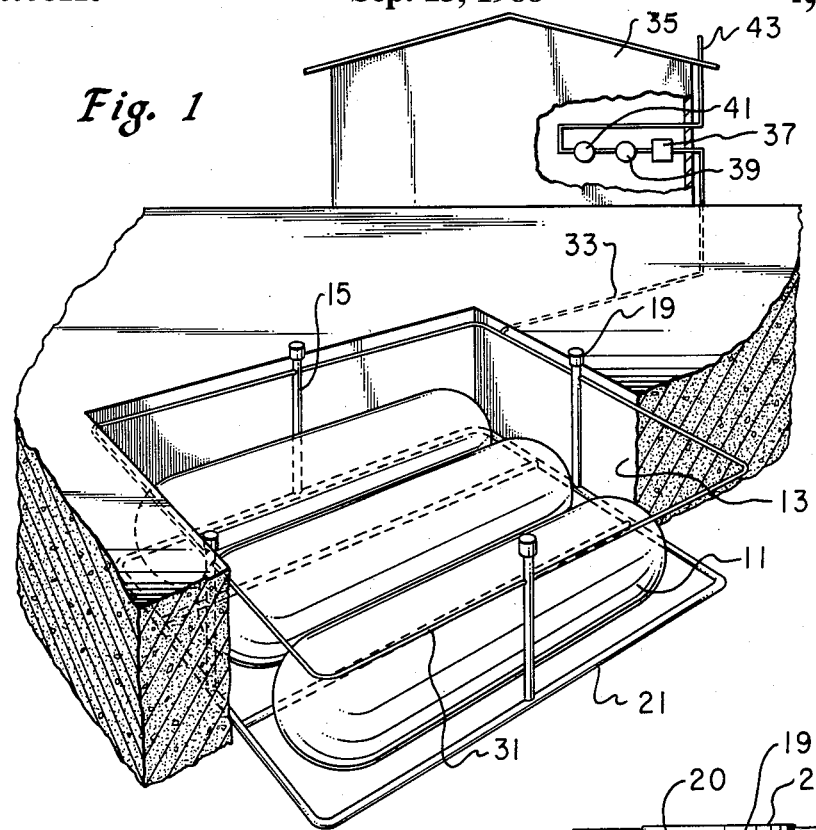
Fig. 1
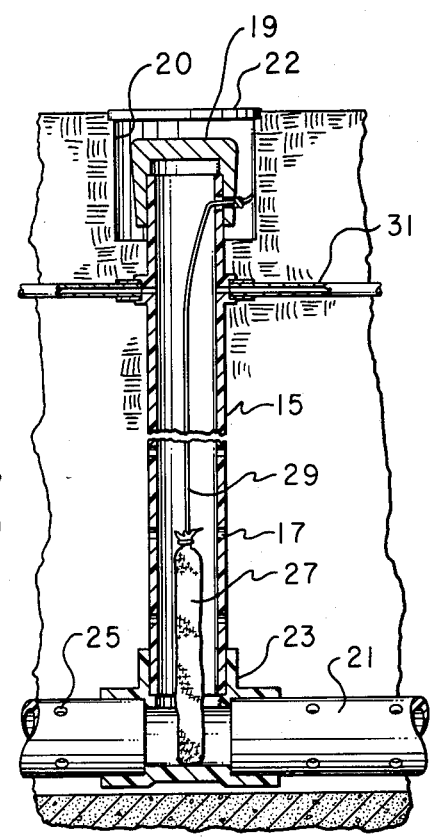
Fig. 2
Fig. 3

HYDROCARBON TANK LEAK DETECTION SYSTEM

BACKGROUND OF THE INVENTION

1. Field of the Invention

This invention relates in general to an apparatus and method for detecting leaks from underground tanks containing hydrocarbon liquids, and in particular to a method using a dye which is soluble in hydrocarbon.

2. Description of the Prior Art

Service stations store gasoline in underground tanks. These large tanks may be made of fiberglass or steel covered with fiberglass. Precautions are taken to minimize the chance of leakage of gasoline from the tank.

Nevertheless, leakage does occur, particularly from the older tanks. Undetected leakage can enter the ground waters in the earth, contaminating the water. The hydrocarbon leakage can run off into drainage pipes and result in the gasoline entering fresh water supplies. Also, the gasoline vapors can create fire hazards in storm and sewer drains.

A leaking underground gasoline tank is difficult to detect. Unless the vapor can be smelled or liquid detected in manholes for storm or sewer drains, one would not know that the tanks are leaking. Also, even if gasoline is discovered in a storm drain or sewer pipe, it may be difficult to determine from which tank the leak is occurring. Often, there will be a number of tanks and service stations located near each other.

One system that has been used recently utilizes a dye that is soluble in hydrocarbons, but not in water. When installing the tanks, the dye is placed in the fill material around the excavation. As a result, if the dye comes into contact with leaking gasoline, it will cause the gasoline to change colors. If the colored liquid shows up in a manhole or other area a distance away from a number of tanks, the color will indicate from which service station the leak is occurring. Each adjacent service station would use a dye material of a different color.

While such a system works, it still does not inform one of leakage unless the leakage is observed in a sewer or storm drain manhole or at some other area. Also, it requires a new installation of tanks. A number of patents exist showing other methods for detecting leaks from gasoline storage tanks.

SUMMARY OF THE INVENTION

The leak detection system of this invention uses one or more riser pipes. These riser pipes are placed around the tank. The lower end of the riser pipe is open to receive any liquid that may be in the earth surrounding the tank.

A dye of a type that is soluble in hydrocarbon liquid but insoluble in water is placed in a permeable container. The container is lowered into the riser pipe on a rope. Periodically, the container is pulled to the surface to determine if leakage has occurred.

BRIEF DESCRIPTION OF THE DRAWINGS

FIG. 1 is a perspective schematic view illustrating a leak detection system constructed in accordance with this invention.

FIG. 2 is an enlarged vertical sectional view illustrating one of the riser pipes of the leak detection system of FIG. 1.

FIG. 3 is a schematic sectional view illustrating an alternate embodiment of the leak detection system of FIG. 1.

DESCRIPTION OF THE PREFERRED EMBODIMENT

Referring to FIG. 1, three underground tanks 11 are shown in an excavation 13. Tanks 11 may be of various types, such as fiberglass, or steel covered with a fiberglass layer. The tanks will be resting on and covered by fill material. The excavation 13 will be a conventional type. Typically, there will be a layer of sand or gravel in the bottom of the excavation, as well as a layer of hard generally impermeable material to cause any leakage of gasoline to run laterally outward, rather than vertically downward.

A plurality of vertical riser pipes 15 are spaced around the tanks 11. The lower end of each riser pipe 15 is located even or slightly below the bottom of each tank 11. Each riser pipe 15 is perferably a polyvinylchloride (PVC) pipe about four inches in diameter and about twelve feet long. Each riser pipe 15 has a plurality of perforations 17 near its bottom. The perforations 17 admit any liquids in the earth surrounding the lower portion of the riser pipe 15 to the interior of the riser pipe 15.

A removable cap 19 is placed on the upper end of each riser pipe 15. Cap 19 does not make the interior of the riser pipe 15 airtight, however. Cap 19 serves to protect objects at the surface from falling into the interior of the riser pipe 15. The cap 19 is located in a small manhole cavity 20 of larger diameter than the cap 19. A removable manhole cover 22 covers the cavity 20 and is flush with the surface. The top of cap 19 will be a short distance below the cover 22.

As shown in FIGS. 1 and 2, a plurality of interconnected lateral pipes 21 interconnect each riser pipe 15 with riser pipes 15 on each side. The lateral pipes 21 are located at the perimeter of the excavation 13, surrounding the tanks 11. Also, the lateral pipes 21 extend between each of the tanks 11. Each lateral pipe 21 is about four inches in diameter, placing the lower side of each lateral pipe 21 about four inches below the bottoms of the tanks 11. The lateral pipes 21 are horizontal and are connected to each riser pipe 15 by a coupling 23. The lateral pipes 21 have perforations 25 extending throughout their length so as to freely admit any liquid in the earth into the lateral pipes 21. The interior of each lateral pipe 21 communicates with the coupling 23 and with the interior of each riser pipe 15.

A bag 27 is lowered into each riser pipe 15 and located at the bottom of each riser pipe 15. Bag 27 is a bag of white fiberglass mesh or cloth that is permeable. The bag 27 is filled with an organic dye. The dye is coated onto a particulate material, which in the preferred embodiment is corn meal. The dye is of a type that is soluable in hydrocarbon liquid, but insoluable in water. Dyes of this nature are conventional and commercially available. The preferred dye is manufactured by Pylam Products Company of Garden City, N.Y. Various colors are available.

Water will have no effect on the dye. Hydrocarbon, however, dissolves the dye. The dye is one of several colors. Consequently, as it dissolves, it will change the color of the gasoline in which it is located. The dissolution of the dye will stain or discolor the bag 27. Preferably, about sixteen pounds of the dye is contained in the bag 27.

A rope 29 is secured to the top of the bag 27. The rope 29 extends to the top of the riser pipe 15. It is secured to a hook or to a hole in cap 19 as shown. By removing the cap 19, the rope 29 is freely accessible to allow an inspector to pull the bag 27 to the surface to determine if the dye in the bag 27 has undergone any dissolution.

As a supplement to the dye, means is also employed to determine if any hydrocarbon vapor is present in the riser pipe 15. This includes a small one-fourth inch diameter tube 31 that is located near the top of each riser pipe 15. The tube 31 is horizontal, parallel to the lateral pipes 21. The tube 31 is located about 18 inches below the surface. The interior of each tube 31 communicates with the interior of each riser pipe 15.

The tube 31 is connected to a conduit 33, as shown in FIG. 1. Conduit 33 leads to a remote location, such as building 35. In the building 35, the conduit 33 leads to a liquid trap 37. Liquid trap 37 will trap any liquids flowing through the conduit 33 into the building 35. A vapor detector 39 of a conventional type is located downstream from the liquid trap 37. Vapor detector 39 has the ability to detect small amounts of the hydrocarbon vapor contained in air. A pump 41 is located downstream of the vapor detector 39. Pump 41 exhausts through an exhaust line 43 to the atmosphere. It will create a suction to draw air from the riser pipes 15 into and past the vapor detector 39.

In the operation of the embodiments of FIGS. 1 and 2, in a new installation, the lateral pipes 21 will be located in the excavation 13 surrounding the tanks 11. The riser pipes 15 will be mounted to the lateral pipes 21. The tube 31 will be in a connected to the riser pipes 15 near the top of each riser pipe 15. The excavation 13 will be filled. A bag 27 of dye material will be placed in each riser pipe 15.

Approximately once a week, an inspector will open each cap 19. He will grab the rope 29 and will pull the bag 27 to the surface to determine if any of the dye has dissolved. If hydrocarbon has leaked into any of the lateral pipes 21 or directly into the riser pipes 15, the dye will have dissolved to some extent and stained the bag 27. This lets the inspector know that leakage has occurred, and steps must be taken to stop the leak.

Also, periodically, the air pump 41 will be started to draw air from each riser pipe 15 for sampling. The air will flow through the vapor detector 39. If any hydrocarbon vapor is present, an indication will be provided to the operator. This will indicate that leakage has occurred from the tanks 11.

In the case where an operator does not wish to install new tanks, or to excavate existing tanks, the system shown in FIG. 3 can be used. Prime symbols will be used to indicate common components. Holes will be drilled at regular intervals of about 10 feet surrounding the tanks 11'. Riser pipes 15' are inserted into each hole. Each riser pipe 15' contains perforations 17' along at least the lower portion. A bag 27' of dye material is located in the bottom of each riser pipe 15'. The bag is connected to a rope 29' leading to the surface to allow the bag 27' to be pulled periodically for inspection. There are no lateral pipes, but any significant leakage of gasoline will spread into contact with at least one of the riser pipes 15' because of the close spacing.

The invention has significant advantages. Leakage is detected by routine inspections. The dye is not affected by water, thus does not enter any water that may be used as drinking water, unless being carried by hydrocarbon through a leak. The system can be retrofitted to existing systems without excavation, or installed with new systems.

While the invention has been shown in only two of its forms, it should be apparent to those skilled in the art that it is not so limited, but is susceptible to various changes without departing from the scope of the invention.

I claim:

1. A leak detection system for detecting leaks of a liquid hydrocarbon from an underground tank, comprising in combination:

at least one riser pipe extending from a point adjacent the bottom of the tank to the surface;
   communication means for communicating hydrocarbon leaked from the tank to the interior of the riser pipe;
   a dye which is soluble in hydrocarbon and insoluble in water;
   a permeable container containing a quantity of the dye;
   means for lowering the container to the bottom of the riser pipe and for retrieving the container to the top of the riser pipe, the dye within the container being exposed to the interior of the pipe for contacting any liquid contained in the pipe, enabling an inspector to periodically pull the container to the surface to determine if any of the dye has dissolved and thus changed the color of the container, indicating leakage of hydrocarbon from the tank.

2. A leak detection system for detecting leaks of a liquid hydrocarbon from an underground tank, comprising in combination:

at least one riser pipe extending from a point adjacent the bottom of the tank to the surface;
   communication means for communicating hydrocarbon leaked from the tank to the interior of the riser pipe;
   a substance which is soluble in hydrocarbon and insoluble in water;
   means for lowering the substance to the bottom of the riser pipe and for retrieving the substance to the top of the riser pipe, the substance being exposed to the interior of the pipe for contacting any liquid contained in the pipe, enabling an inspector to periodically pull the substance to the surface to determine if any of the substance has dissolved, indicating leakage of hydrocarbon from the tank;
   the communication means comprising perforations in the riser pipe; and
   the substance being carried in a permeable container.

3. A leak detection system for detecting leaks of a liquid hydrocarbon from an underground tank, comprising in combination:

a plurality of riser pipes spaced around the tank and extending from a point adjacent the bottom of the tank to the surface, the interior of each riser pipe being exposed to any liquid in the surrounding earth;
   a dye which is soluble in hydrocarbon but not in water, the dye being coated onto a solid carrier material;
   a permeable container containing a quantity of the dye and adapted to be placed in the bottom of each riser pipe for being exposed to any liquids contained in the earth adjacent the bottom of the tank; and a line extending from each container to the top of each riser pipe for enabling an inspector to periodically pull the container to the surface to determine if the color of the container has changed, indicating leakage of hydrocarbon from the tank.

4. The leak detection system according to claim 3, further comprising a plurality of perforated lateral pipes extending generally horizontally through the earth, each lateral pipe being connected to at least one of the riser pipes.

5. A leak detection system for detecting leaks of a liquid hydrocarbon from an underground tank, comprising in combination:
 a plurality of riser pipes spaced around the tank and extending from a point adjacent the bottom of the tank to the surface;
 a plurality of perforated lateral pipes extending horizontally through the earth around the bottom of the tank and interconnecting the lower ends of the riser pipes for communicating any fluids in the earth around the bottom of the tank to the interior of the riser pipes;
 a dye which is soluble in hydrocarbon and insoluble in water, the dye being coated onto a particulate carrier material;
 a permeable container containing a quantity of the dye and adapted to be placed in the bottom of each riser pipe for being exposed to any liquids contained in the riser pipes;
 a line extending from each container to the top of each riser pipe for enabling an inspector to periodically pull the container to the surface to determine if the color of the container has changed, indicating leakage of hydrocarbon from the tank;
 suction means for selectively withdrawing gas from the riser pipes; and
 detecting means connected to the suction means for detecting if any of the gas withdrawn from the riser pipes contains hydrocarbon vapor.

6. The leak detection system according to claim 5 wherein the suction means and the detecting means are remotely located from the riser pipes and connected to the riser pipes by a conduit.

7. The leak detection system according to claim 5 wherein a tube extends between each of the riser pipes adjacent the tops of the riser pipes, and wherein the suction means is connected to the tube by a conduit.

8. A method for detecting leaks of a liquid hydrocarbon from an underground tank, comprising in combination:
 providing at least one riser pipe extending from a point adjacent the bottom of the tank to the surface;
 providing a dye which will dissolve in hydrocarbon but not in water;
 placing the dye in a permeable container and lowering container to the bottom of the pipe for being exposed to any liquids contained in the earth adjacent the bottom of the tank; and
 periodically pulling the container to the surface to determine if the color of the container has changed, indicating leakage of hydrocarbon from the tank.

9. The method according to claim 8 further comprising the step of coating the dye onto a particulate carrier material prior to placing it in the container.

* * * * *